D. T. GILLIS.
Harrows.

No. 157,960.  Patented Dec. 22, 1874.

Attest:
C. Clarence Poole
W. E. Chaffee

Inventor:
David T. Gillis
By J. B. Woodruff
Attorney

UNITED STATES PATENT OFFICE.

DAVID T. GILLIS, OF STOCKTON, CALIFORNIA.

IMPROVEMENT IN HARROWS.

Specification forming part of Letters Patent No. 157,960, dated December 22, 1874; application filed July 28, 1874.

*To all whom it may concern:*

Be it known that I, DAVID T. GILLIS, of Stockton, in the county of San Joaquin and State of California, have invented certain new and useful Improvements in Adjustable Raking-Harrows, the teeth of which can be placed and secured at any desired inclination back or forward; and the following is a full, clear, and exact description of the same, reference being had to the accompanying drawings, making a part of this specification, in which—

Figure 1:
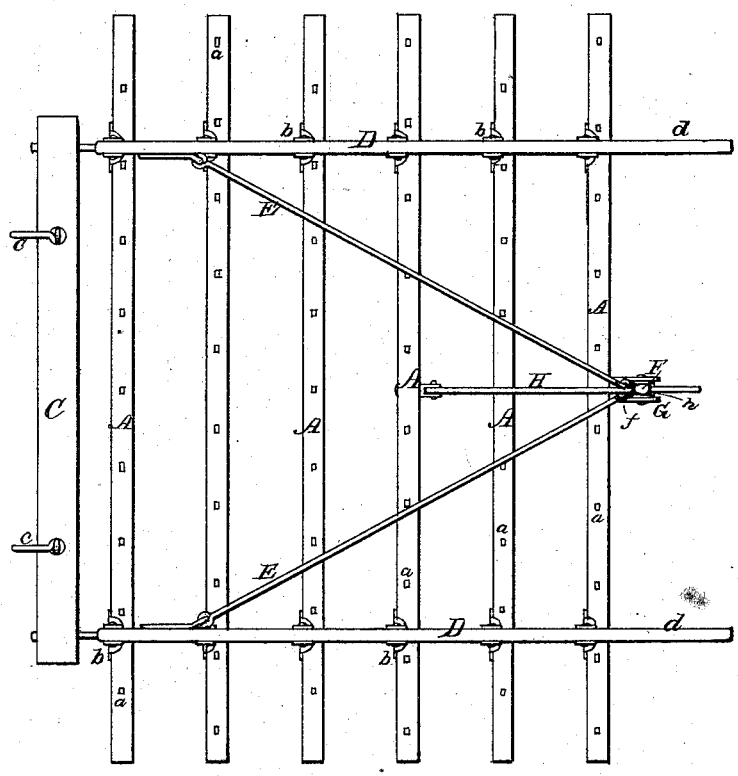
Figure 2:
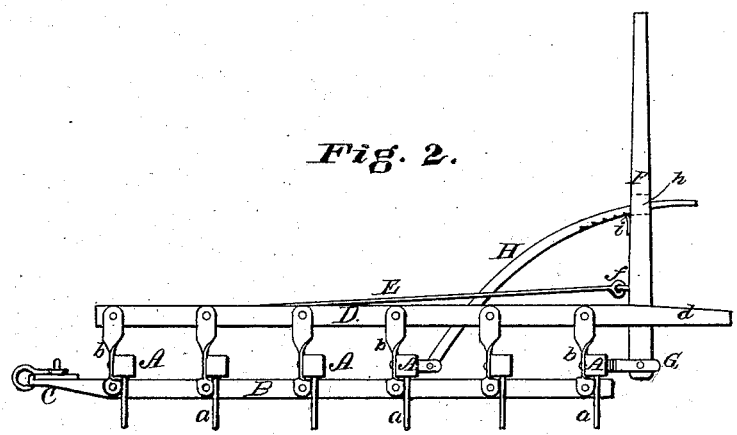

Figure 1 represents a plan or top view of my improvements, showing the braces, &c. Fig. 2 is a side view of the same, showing the ends of the series of timbers into which the harrow-teeth are inserted, also, the bars and hinges for changing the inclination of the teeth, likewise the device for holding the same in position.

My invention consists in the arrangement and combination of the movable longitudinal bars above and below the transverse timbers, in which the teeth are inserted; the metal bracket hinges, which secure them firmly together; the angular braces connecting the same with a vertical lever; and the curved ratchet-bar for adjusting and holding the harrow-teeth in a firm position at any desired inclination either back or forward.

I make my improved adjustable raking-harrows with from five to ten timbers, A A, of any desired size and length, to be suitable to the soil and team for working. The harrow-teeth *a a* may be of any desired size, length, and number requisite, and put into the timbers A A in the usual manner. To each of the timbers, on their front side or face, I secure with rivets or bolts two of the hinge-brackets, *b b*, which are made of wrought or malleable cast-iron, of the suitable form, and the required strength, to connect with the transverse bars B B underneath the timbers A A, the bars being made of flat bar-iron of suitable strength, and are secured to the draft-beam C in front, at a suitable distance apart to equalize the strength of the teeth-timbers A A. The draft-beam C is provided with one or more clevis, and pin *c*, to hitch the team to for working. The iron brackets *b b* extend above the timbers A A sufficient to give leverage to turn the timbers they are secured to, and are made forked at the top to receive the transverse beams D D, made of tough hard wood, to which they are pivoted by bolts or rivets, they extending back to form handles *d d* to lift the harrow by over any obstruction that would be liable to injure it. To near the front ends of the beams D D are secured the angular rods of iron E E to form braces, and a support for the vertical lever F, to which they are connected by a staple, *f*, at about the same height above the beams A A that the transverse beams D D are, the lever F being secured to the rear timber A′ centrally by the metal bracket G, so as to move backward and forward in it. To one of the middle timbers, A, I attach a curved ratchet-bar, H, which extends up and back, and passes through a mortise, *h*, made in the vertical lever F, which is provided with a stationary pawl, *i*, by which the beams A A may be turned in either direction, so as to place the teeth *a a* at any desired inclination, almost instantly, and hold them in their position.

I do not claim, broadly, an adjustable raking-harrow with such devices as have been hitherto used to operate them; but What I do claim as my invention is—

The combination of the movable timbers D D above, the bars B B below, the series of transverse harrow-teeth timbers A A, the metal hinge-brackets *b b*, the angular braces E E, vertical lever F, and the curved ratchet-bar H, and pawl *i*, all constructed to operate substantially in the manner as herein shown and described, for the purposes set forth.

In testimony whereof I hereunto subscribe my name.

DAVID T. GILLIS.

Witnesses:
   GEO. PERRY,
   S. VISHE.